United States Patent
Kim

[19]

[11] Patent Number: 5,930,096
[45] Date of Patent: Jul. 27, 1999

[54] OVERVOLTAGE AND SURGE PROTECTION CIRCUIT IN A HARD DISK DRIVE

[75] Inventor: Jae-June Kim, Kyungsangbuk-do, Rep. of Korea

[73] Assignee: SamSung Electronics Co., Ltd., Kyungki-do, Rep. of Korea

[21] Appl. No.: 09/089,664

[22] Filed: Jun. 3, 1998

[30] Foreign Application Priority Data

Jun. 3, 1997 [KR] Rep. of Korea ...................... 97-22831

[51] Int. Cl.$^6$ ................................................... H02H 3/20
[52] U.S. Cl. ............................... 361/91; 361/84; 361/56; 307/75; 307/86
[58] Field of Search .................................. 361/18, 56–58, 361/77.82, 84, 91; 307/43, 44, 64, 75, 86

[56] References Cited

U.S. PATENT DOCUMENTS

| | | | |
|---|---|---|---|
| 4,423,456 | 12/1983 | Zaidenweber | 361/77 |
| 4,473,757 | 9/1984 | Farago et al. | 307/127 |
| 5,521,683 | 5/1996 | Miyamotor et al. | 355/246 |
| 5,587,685 | 12/1996 | Johansson | 361/58 |
| 5,751,531 | 5/1998 | Rault | 361/56 |

FOREIGN PATENT DOCUMENTS

| | | |
|---|---|---|
| 0653 752 A2 | 5/1995 | European Pat. Off. . |
| 1 393748 | 5/1975 | United Kingdom . |
| 1 600 438 | 10/1981 | United Kingdom . |
| 2 175 463 | 11/1986 | United Kingdom . |

*Primary Examiner*—Sally C. Medley
*Attorney, Agent, or Firm*—Robert E. Bushnell, Esq.

[57] ABSTRACT

An overvoltage and surge protection circuit for a hard disk drive is provided. The overvoltage and surge protection circuit is intended for protecting an interior circuit part from a surge voltage caused by an overvoltage generated due to wrong insertion of first and second power supply voltages, and an external condition, in a hard disk drive which receive the first power supply voltage as an operational voltage of an interior circuit device and the second power supply voltage as a device driving voltage. The overvoltage and surge protection circuit includes an overvoltage protection circuit having a first and second power supply input terminals for receiving the first and second power supply voltages, respectively, and a surge protection circuit. The overvoltage protection circuit lowers the level of the second power supply voltage below the level of the first power supply voltage, using the first power supply voltage applied through the second power supply input termninal, and applies the lowered second power supply voltage to a load of the interior circuit device, when the second power supply voltage is applied through the first power supply input terminal. The surge protection circuit lowered the surge voltage to a constant voltage below the first power supply voltage, and applied the constant voltage to the load of the interior circuit device, when the surge voltage is applied through the first power supply input terminal and the overvoltage protection circuit.

14 Claims, 4 Drawing Sheets

1

OVERVOLTAGE AND SURGE PROTECTION CIRCUIT IN A HARD DISK DRIVE

CLAIM OF PRIORITY

This application makes reference to, incorporates the same herein, and claims all benefits accruing under 35 U.S.C ♀119 from an application entitled Overvoltage And Surge Protection Circuit In Hard Disk Drive earlier filed in the Korean Industrial Property Office on Jun. 3, 1997, and there duly assigned Ser. No. 97-22831 by that Office.

BACKGROUND OF THE INVENTION

1. Field of the Invention

The present invention relates to a hard disk drive, and in particular, to a circuit for protecting circuit parts from overvoltage and surge voltage in a hard disk drive.

2. Description of the Related Art

Recently, a data storing and reading device has rapidly been developed toward large capacity and high-speed data access to satisfy demands for a multimedia system. One of such data storing and reading devices is a hard disk drive, which is widely used as an auxiliary memory device for a computer system due to its advantages of high-speed data access and large capacity. This hard disk drive generally uses two power supplies, for example, +5 V and +12 V. That is, the hard disk drive includes a +5 V power supply input terminal for receiving +5 V as an operational power supply voltage of interior circuit devices, and a +12 V power supply input terminal for receiving +12 V as a device driving power supply voltage. A protection circuit may intervene between the +5 V power supply input terminal for receiving +5 V and circuit parts operated at +5 V in the hard disk drive, to prevent damage to the circuit parts. Such protection circuits include a fuse for sensing and blocking an overvoltage, a ferrite bead for replacing the fuse or filtering a power supply, and a noise filter having a resistor and a capacitor, for removing noise from a power supply.

Such protection circuits are not effective in protecting interior circuit parts in a hard disk drive against a surge voltage applied in several tens of milliseconds, since, for example, a fuse is shorted in several seconds regardless of the current sensing capability of the fuse. That is, with a surge voltage applied, the fuse is shorted after the circuit parts are damaged. Such problem arises from designing the protection circuits for a stable power supply environment, not compatible with an unstable power supply varying environment.

Protection circuits for protecting against overvoltages are known. One such protection circuit is described by Pierre Rault in U.S. Pat. No. 5,751,531 entitled Protection Circuit Against High Energy Overvoltages, Having A Controlled Clipping Voltage.

SUMMARY OF THE INVENTION

An object of the present invention is to provide a circuit for stably protecting circuit parts from a surge voltage applied to the power supply input terminal of the hard disk drive by the input condition of an overvoltage and an unstable alternating current (AC) power.

To achieve the above object, there is provided an overvoltage and surge protection circuit for a hard disk drive. The overvoltage and surge protection circuit is intended for protecting an interior circuit part from a surge voltage caused by an overvoltage generated due to wrong insertion of first and second power supply voltages, and an external condition, in a hard disk drive which receive the first power supply voltage as an operational voltage of an interior circuit device and the second power supply voltage as a device driving voltage. The overvoltage and surge protection circuit includes an overvoltage protection circuit having a first and second power supply input terminals for receiving the first and second power supply voltages, respectively, and a surge protection circuit. The overvoltage protection circuit lowers the level of the second power supply voltage below the level of the first power supply voltage, using the first power supply voltage applied through the second power supply input terminal, and applies the lowered second power supply voltage to a load of the interior circuit device, when the second power supply voltage is applied through the first power supply input terminal. The surge protection circuit lowered the surge voltage to a constant voltage below the first power supply voltage, and applied the constant voltage to the load of the interior circuit device, when the surge voltage is applied through the first power supply input terminal and the overvoltage protection circuit.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The embodiment of the present invention presents a circuit for stably protecting circuit parts against a surge voltage applied to a +5 V power supply input terminal of the hard disk drive by the input condition of an overvoltage and an unstable AC power. An overvoltage is produced at the +5 V power supply input terminal when a user inserts a wrong connector of the power supply input terminal, or when a power supply manufacturing company makes a wrong connector for the power supply terminal. That is, an overvoltage is generated when +12 V is applied to the +5 V power supply input terminal.

To provide an overvoltage and surge protection circuit, the present invention will consider the state of the drive when two power supply voltages +5 V and +12 V are wrongly applied. In addition, conditions of the drive for keeping a constant power supply voltage will be considered, when AC input to a switching mode power supply (SMPS) is rapidly varied and a surge voltage is applied to the drive from an output terminal of the SMPS. In a test of the present invention, the voltage limit and the surge voltage limit of the +5 V power supply input terminal are set to 8.6–9.0 V and 12.3–12.5 V, respectively.

Figure 1:
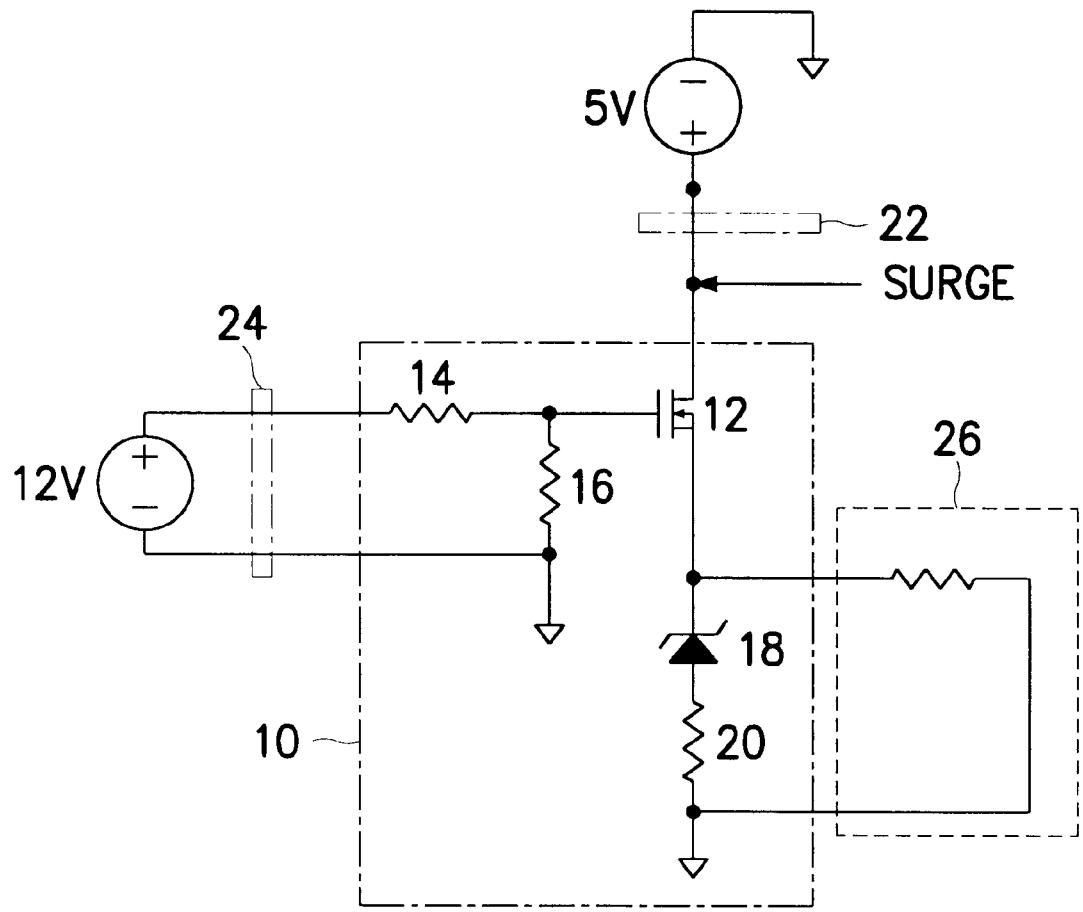
FIG. 1 is a circuit diagram of an overvoltage and surge protection circuit according to an embodiment of the present invention, in a steady state, that is, when a corresponding power supply is inserted to each power supply input terminal.
Figure 2:
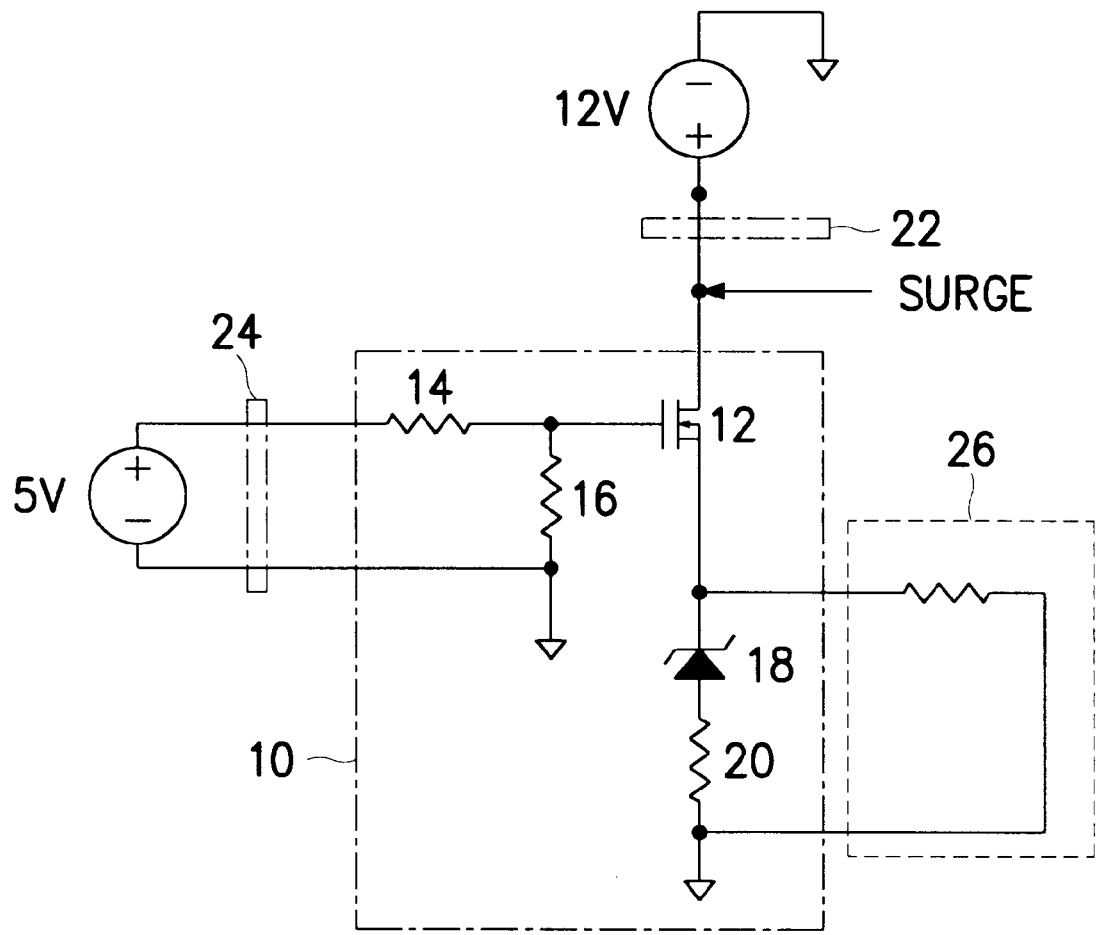
FIG. 2 is a circuit diagram of the overvoltage and surge protection circuit according to the embodiment of the present invention, in an abnormal state, that is, when a wrong power supply is inserted to each power supply input terminal.

FIG. 1 is a circuit diagram of the overvoltage and surge protection circuit according to the embodiment of the present invention, in a steady state, that is, when a corresponding power supply is inserted to each power supply input terminal. FIG. 2 is a circuit diagram of the overvoltage and surge protection circuit according to the embodiment of the present invention, in an abnormal state, that is, when a wrong power supply is inserted to each power supply input terminal.

Referring to FIGS. 1 and 2, an overvoltage and surge protection circuit 10 according to the embodiment of the present invention is disposed between a +5 V power supply input terminal 22 for receiving +5 V as an operational voltage of interior circuit parts and a circuit device load operated at +5 V in a hard disk drive. The overvoltage and surge protection circuit 10 includes an overvoltage protection circuit which has an N-channel MOS field effect transistor 12 (hereinafter, referred to as an N-channel MOS transistor 12), and voltage dividing resistors 14 and 16, and a surge protection circuit which has a zener diode 18 and a resistor 20. The N-channel MOS transistor 12 has a drain connected to the +5 V power supply input terminal 22, a source connected to the zener diode 18, and a gate connected to a +12 power supply input terminal 24 through the voltage dividing resistors 14 and 16. The +12 V power supply input terminal 24 serves to receive +12 V as a device driving power supply voltage.

In FIG. 1, a corresponding power supply is inserted to each power supply input terminal, that is, a +5 V power supply is connected to the +5 V power supply input terminal 22, and a +12 power supply is connected to the +12 V power supply input terminal 24. In FIG. 2, a wrong power supply is inserted to each power supply input terminal.

Referring to FIG. 1, the operation of the overvoltage and surge protection circuit 10 in a steady state will be described. +12 V applied via the +12 power supply input terminal 24 is appropriately divided by the voltage dividing resistors 14 and 16, and supplied to the gate of the-N channel MOS transistor 12. The voltage applied to the gate of the N channel MOS transistor 12 should have so high a level as to transmit a voltage from the drain of the N-channel MOS transistor 12 to the source thereof, that is, to completely turn on the N-channel MOS transistor 12. For this purpose, the values of the resistors 14 and 16 should be set in consideration of the characteristics of the N-channel MOS transistor 12. Then, +5 V applied via the +5 V power supply input terminal 22 is supplied to the circuit device load in the hard disk drive through the conductive N-channel MOS transistor 12.

Referring to FIG. 2, the operation of the overvoltage and surge protection circuit 10 when a wrong power supply is inserted to each power supply input terminal will be described. +5 V applied via the +12 V power supply input terminal 24 is appropriately divided by the voltage dividing resistors 14 and 16, and supplied to the gate of the N-channel MOS transistor 12. Here, the voltage applied to the gate is so small that the N-channel MOS transistor 12 is partially conductive. Thus, +12 V applied via the +5 V power supply input terminal 22 is supplied to the circuit device load 26 of the hard disk drive through the partially conductive N-channel MOS transistor 12. The voltage output from the source of the N-channel MOS transistor 12 to the circuit device load 26 of the hard disk drive is lower than 5 V, thus not damaging interior circuit parts.

Meanwhile, when a surge voltage is introduced via the +5 V power supply input terminal 22 due to variations in external conditions, the surge voltage is removed by the zener diode 18 in the overvoltage and surge protection circuit 10. That is, when the surge voltage passes through the N-channel MOS transistor 12, the zener diode 18 converts it to a constant voltage, preferably, 5 V.

Figure 3A:
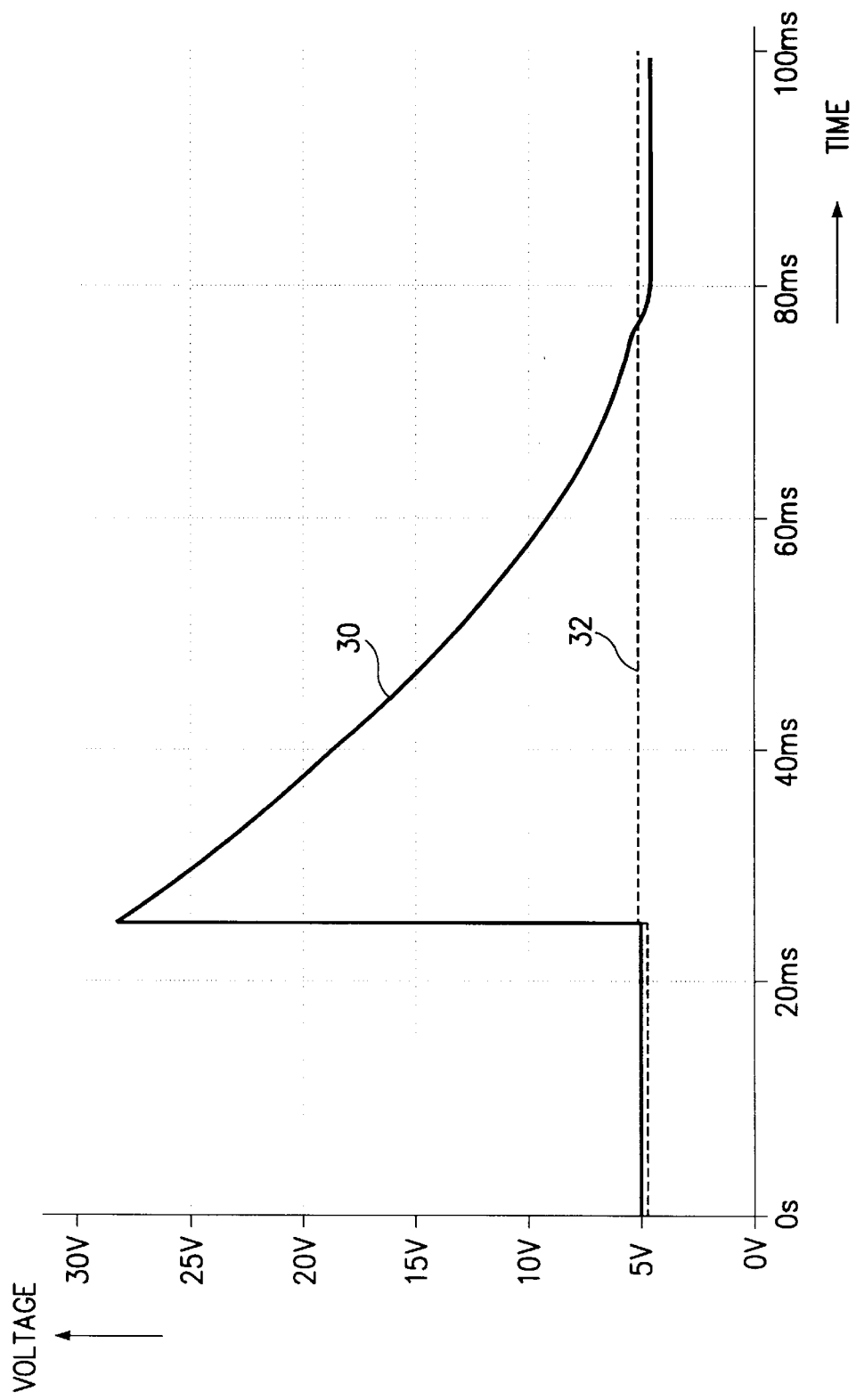
FIGS. 3A and 3B are graphs illustrating of the state of a power supply voltage applied to a power supply input terminal in presence of a surge voltage in a drive, as a result of a test according to the embodiment of the present invention.
Figure 3B:
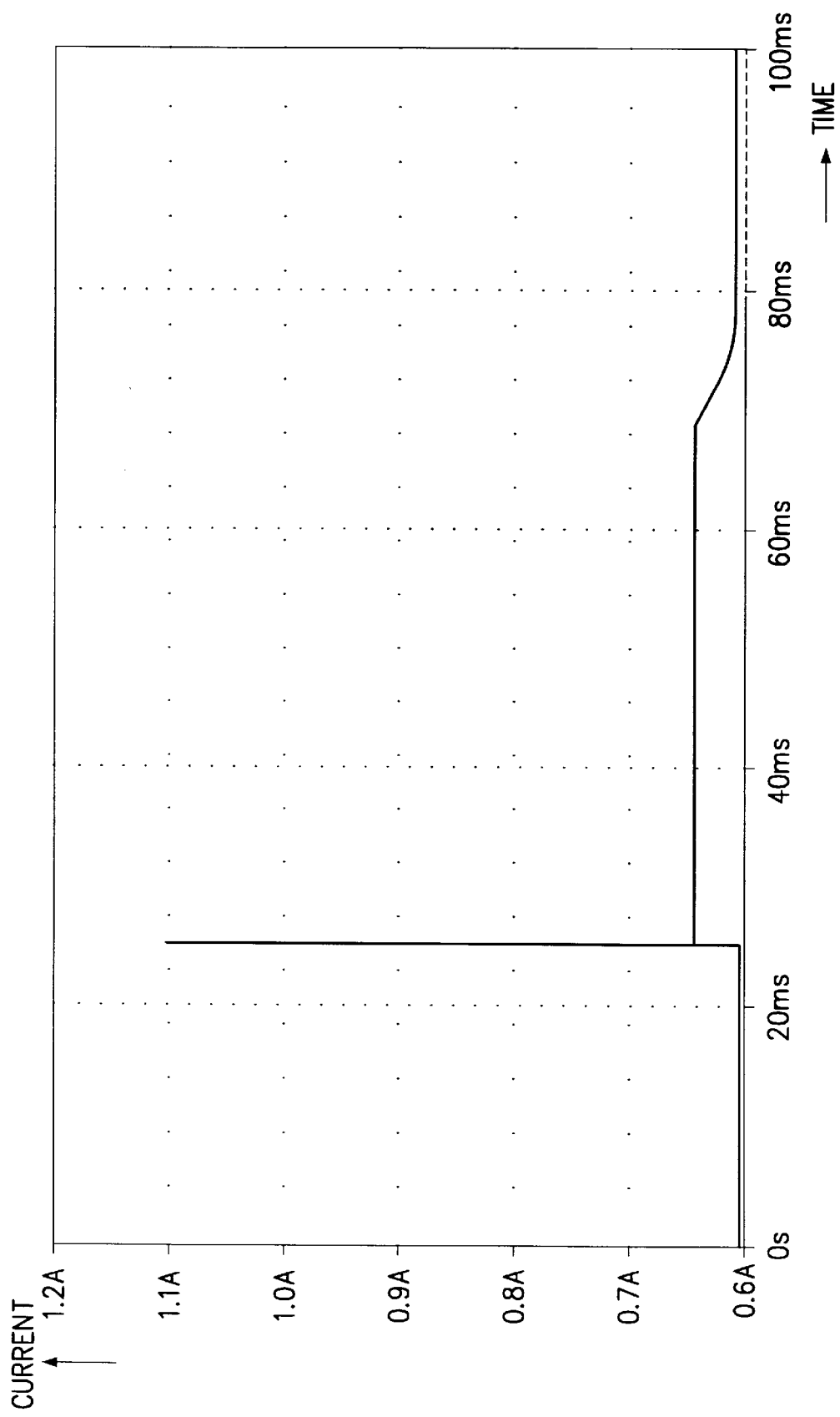

FIGS. 3A and 3B are graphs illustrating the result of a test according to the embodiment of the present invention, that is, the state of a power supply voltage applied to a drive power supply input terminal when a surge voltage is applied. In the present invention, the surge voltage has a waveform as shown in FIG. 3A, (a triangular surge pulse with a 50 msec-lasting peak voltage of about 27.5 V). As a result, the circuit device operational voltage is kept at about 5 V by the zener diode 18. Though, as shown in FIG. 3B, a peak current increases to about 1.1 A, it lasts only 4–10 $\mu$sec, not damaging the circuit parts. Then, an average current becomes 0.7 A or below with passage of discharge time, not damaging the circuit parts.

As described above, the overvoltage and surge protection circuit of the present invention stably protects circuit parts against a surge voltage applied to a drive by input of an overvoltage and an unstable AC power, and stably operates under normal voltage conditions. Thus, process/product failures are reduced, resulting in an increase in product reliability.

While the present invention has been described referring to the specific embodiment, it is clearly understood that many variations can be made by anyone skilled in the art, within the scope and spirit of the present invention.

What is claimed is:

1. An overvoltage and surge protection circuit for protecting an interior circuit part from a surge voltage caused by an overvoltage generated due to wrong insertion of first and second power supply voltages, and an external condition, in a hard disk drive which receive the first power supply voltage as an operational voltage of an interior circuit device and the second power supply voltage as a device driving voltage, comprising:

an overvoltage protection circuit having a first and second power supply input terminals for receiving the first and second power supply voltages, respectively, for lowering the level of the second power supply voltage below the level of the first power supply voltage, using the first power supply voltage applied through the second power supply input terminal, and applying the lowered second power supply voltage to a load of the interior circuit device, when the second power supply voltage is applied through the first power supply input terminal; and a surge protection circuit for lowering the surge voltage to a constant voltage below the first power supply voltage, and applying the constant voltage to the load of the interior circuit device, when the surge voltage is applied through the first power supply input terminal and the overvoltage protection circuit.

2. The overvoltage and surge protection circuit as set forth in claim 1, wherein said overvoltage protection circuit comprises:

a transistor having a drain connected to said first power supply input terminal, a source connected to said surge protection circuit and a gate connected to said second power supply input terminal via a first resistor; and a second resistor connected between said gate and a ground terminal.

3. The overvoltage and surge protection circuit as set forth in claim 2, wherein said surge protection circuit comprises a zener diode and a third resistor connected in series between said source of said transistor and said ground terminal.

4. The overvoltage and surge protection circuit as set forth in claim 3, wherein said transistor comprises a N-channel MOS field effect transistor.

5. The overvoltage and surge protection circuit as set forth in claim 2, wherein said transistor comprises a N-channel MOS field effect transistor.

6. The overvoltage and surge protection circuit as set forth in claim 1, wherein said surge protection circuit comprises a zener diode and a resistor connected in series between said overvoltage protection circuit and a ground terminal.

7. An overvoltage and surge protection circuit for a hard disk drive, comprising:
   a first voltage source input terminal connectable to a first direct current voltage;
   a second voltage source input terminal being connectable to a second direct current voltage, said second direct current voltage being higher than said first direct current voltage;
   a transistor having a drain connected to said first voltage source input terminal, a source, and a gate connected to said second voltage source input terminal via a first resistor;
   a second resistor connected between said gate and a ground terminal; and
   a zener diode and a third resistor connected in series between said source of said transistor and said ground terminal.

8. The overvoltage and surge protection circuit as set forth in claim 7, wherein said transistor comprises a N-channel MOS field effect transistor.

9. An overvoltage and surge protection circuit for a hard disk drive, comprising:
   a first voltage source input terminal connectable to a first direct current voltage;
   a second voltage source input terminal being connectable to a second direct current voltage, said second direct current voltage being higher than said first direct current voltage;
   a surge protection circuit connected to a load; and
   an overvoltage protection circuit having a first terminal connected to said first voltage source input terminal and a second terminal connected to said second voltage source input terminal, said overvoltage protection circuit being enabled to connect said surge protection circuit to said first voltage source input terminal when second voltage source input terminal is connected to said second direct current voltage, said overvoltage protection circuit being disabled from connecting said surge protection circuit to said first voltage source input terminal if said second voltage source input terminal is connected to said first direct current voltage.

10. The overvoltage and surge protection circuit as set forth in claim 9, wherein said overvoltage protection circuit comprises:
   a transistor having a drain connected to said first voltage source input terminal, a source connected to said surge protection circuit and a gate connected to said second voltage source input terminal via a first resistor; and
   a second resistor connected between said gate and a ground terminal.

11. The overvoltage and surge protection circuit as set forth in claim 10, wherein said surge protection circuit comprises a zener diode and a third resistor connected in series between said source of said transitor and said ground terminal.

12. The overvoltage and surge protection circuit as set forth in claim 11, wherein said transistor comprises a N-channel MOS field effect transistor.

13. The overvoltage and surge protection circuit as set forth in claim 9, wherein said surge protection circuit comprises a zener diode and a resistor connected in series between said overvoltage protection circuit and a ground terminal.

14. The overvoltage and surge protection circuit as set forth in claim 13, wherein said transistor comprises a N-channel MOS field effect transistor.

* * * * *